United States Patent [19]

Watanabe

[11] 4,407,861

[45] Oct. 4, 1983

[54] METHOD OF MANUFACTURING A MAGNETIC RECORDING MEDIUM OF THIN METALLIC FILM TYPE

[75] Inventor: Seizo Watanabe, Hachioji, Japan

[73] Assignee: Olympus Optical Co., Ltd., Tokyo, Japan

[21] Appl. No.: 403,867

[22] Filed: Jul. 30, 1982

[30] Foreign Application Priority Data

Aug. 10, 1981 [JP] Japan .................................. 56-125122

[51] Int. Cl.$^3$ ............................................. H01F 10/02
[52] U.S. Cl. .................................... 427/130; 427/132; 427/172
[58] Field of Search ......................... 427/130, 132, 172

[56] References Cited

U.S. PATENT DOCUMENTS 3,915,779  10/1975  Yoshikawa et al. ............. 427/172 X Primary Examiner—Bernard D. Pianalto
Attorney, Agent, or Firm—Frishauf, Holtz, Goodman and Woodward

[57] ABSTRACT

A method of manufacturing a magnetic recording medium of thin metallic film type comprises, a first step of forming a thin magnetic metallic film layer on a base film which heat-contracts both in a first direction and in a second direction perpendicular to first direction, and a second step of heating the base film, while preventing the base film from heat-contracting in the first direction and thus heat-contracting the base film in the second direction, thereby making cracks in the thin magnetic metallic film layer which extend substantially parallel to the first direction of the base film.

4 Claims, 3 Drawing Figures

METHOD OF MANUFACTURING A MAGNETIC RECORDING MEDIUM OF THIN METALLIC FILM TYPE

BACKGROUND OF THE INVENTION

The present invention relates to a method of manufacturing a magnetic recording medium, particularly of thin metallic film type.

Instead of magnetic recording media of coating type, attention is now being paid to a magnetic recording medium of thin metallic film type which has high magnetic coercive force and high residual flux density. The magnetic recording medium of thin metallic film type is usually made by forming a thin metallic magnetic film layer directly on a plastic base film by means of vacuum evaporation. Because of strong internal stress left in the thin metallic film at the time of vacuum evaporation, however, the magnetic recording medium is warped making the side of its magnetic layer concave. With a magnetic medium such as magnetic tape, when there is a warp, the running capacity worsens, its winding order is disturbed and it can not be used with a magnetic recording medium such as magnetic sheet.

In order to prevent warps in the magnetic recording medium of thin metallic film type, cracks are provided in the magnetic layer, nearly parallel to its recording direction. When such cracks are provided in the magnetic layer, the internal stress left in the width direction of magnetic layer, that is, in a direction perpendicular to the recording direction of magnetic layer is reduced to give flexibility to the magnetic recording medium as well as to prevent the magnetic recording medium from being warped. The running capacity of magnetic recording medium of thin metallic film type can be thus improved remarkably. A well-known method of manufacturing this thin metallic film type of magnetic recording medium is disclosed by Japanese Patent Disclosure No. 53/83706 in which a thin metallic film type of magnetic recording medium is passed between a convex roller and a concave roller to form cracks on its magnetic layer. This method, however, needs special mechanical units such as convex and concave rollers, thus increasing the cost of manufacturing recording media.

SUMMARY OF THE INVENTION

The present invention is therefore intended to eliminate the above-mentioned drawbacks and its object is to provide a method of cheaply manufacturing a magnetic recording medium of thin metallic film type with cracks in its magnetic layer.

According to one aspect of the present invention, the method comprises a first step of forming a thin magnetic metallic film layer on a base film which is heat-contracted in a first direction and in a second direction perpendicular to the first direction, and a second step of heating the base film, while preventing the base film from heat-contracting in the first direction and thus heat-contracting the base film in the second direction, thereby making cracks in the thin magnetic metallic film layer which extend substantially parallel to the first direction of the base film. According to this method, cracks are made in the thin magnetic metallic film layer by heating the base film while preventing it from heat-contracting in the first direction but allowing it to be heat-contracted in the second direction. Therefore, this method enables cracks to be easily formed on the thin magnetic metallic film layer not using special mechanical units such as convex and concave rollers but common mechanical units. This method therefore enables a magnetic recording medium of thin metallic film type, with cracks in its thin magnetic metallic film layer and with excellent running capacity to be manufactured cheaply.

DETAILED DESCRIPTION OF THE PREFERRED EMBODIMENT

An embodiment of the present invention will be described in detail referring to drawings.

Figure 1:
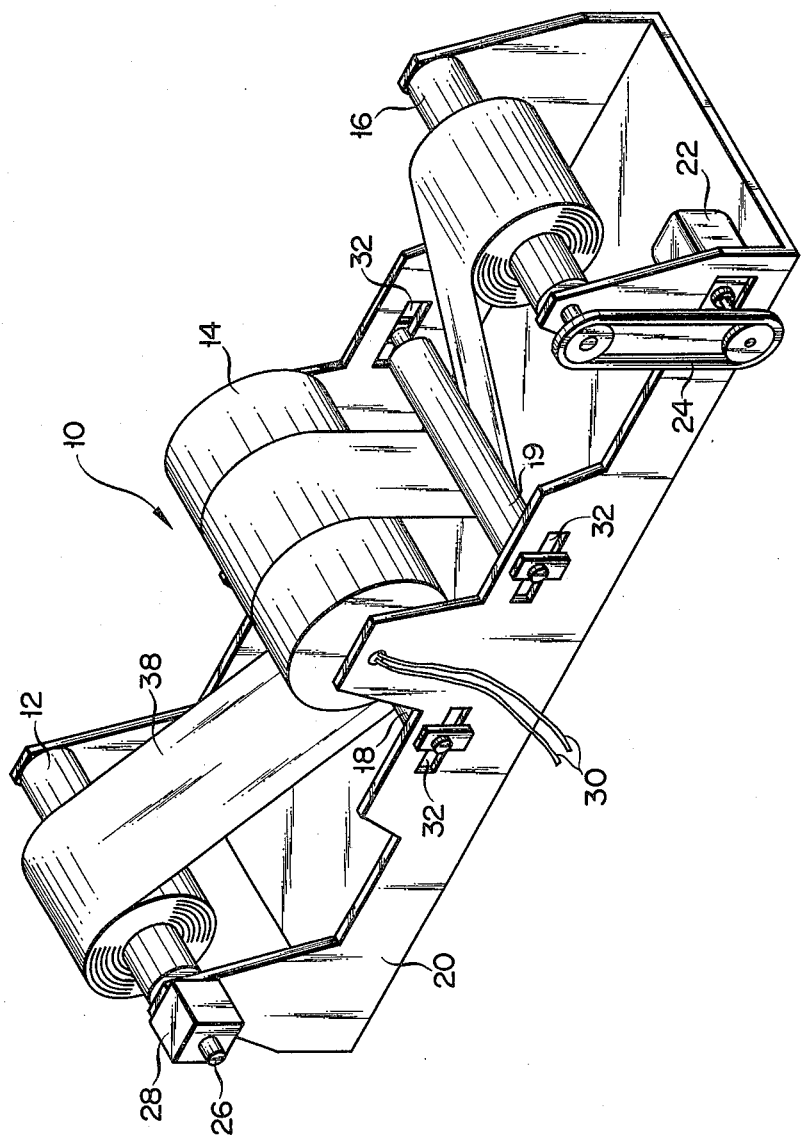
FIG. 1 is a perspective view showing an example of a mechanical unit employed to embody the present invention.
Figure 2:
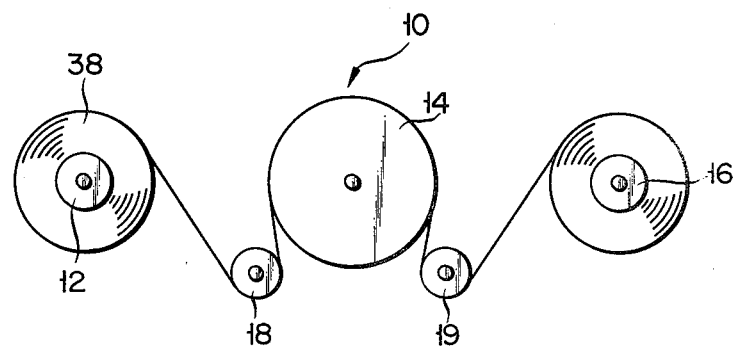
FIG. 2 is a side view schematically showing the mechanical unit shown in FIG. 1.

First, an embodiment of a manufacturing device employed to embody the present invention will be explained. As shown in FIGS. 1 and 2, a manufacturing device 10 comprises a feeding roller 12, a heating roller 14, a winding roller 16 and a pair of idler rollers 18 and 19. Each of the rollers is cylindrical and rotatably supported by a support frame 20. Rollers are arranged with their central axes parallel to one another and feeding and winding rollers 12 and 16 are located on either side of heating roller 14 with one of idler rollers 18 and 19 interposed between the heating roller 14 and rollers 12 and 16, respectively. The winding roller 16 is connected via a belt 24 to a motor 22 attached to the support frame 20 and rotated by this motor 22. The feeding roller 12 has a rotatable shaft 26 to which a control means 28 having clutch and brake is attached to control the rotating rate. The heating roller 14 houses a heater (not shown) which serves as a heating means and which is connected via a cord 30 to a power source (not shown). The heating roller 14 is heated by the heater to a predetermined temperature. Idler rollers 18 and 19 arranged on both sides of heating roller 14 are movably supported along guide slits 32 formed in the support frame 20.

Figure 3:
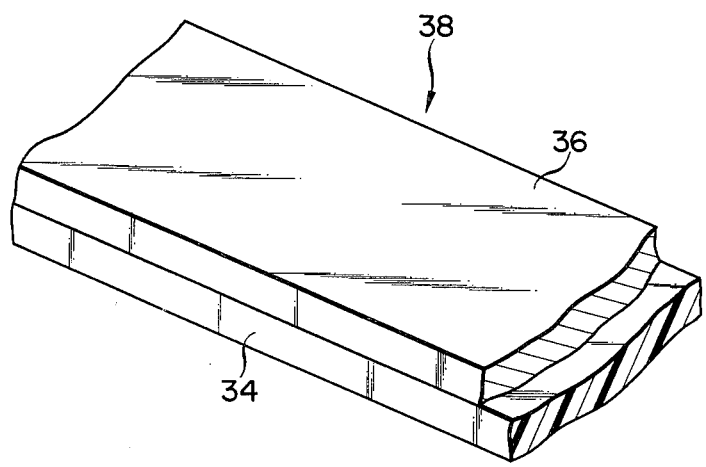
FIG. 3 is a perspective view schematically showing an example of a magnetic recording medium.

The following is a description of how a magnetic recording medium of thin metallic film type, or a magnetic tape in this case is fabricated using the above-described device. A magnetic tape 38 shown in FIG. 3 is fabricated by forming a thin magnetic metallic film layer 36 on a base film 34 by well known vacuum evaporation, for example. The base film 34 is of polyethylene terephthalate, about 6 $\mu$m thick and about 450 mm wide. This polyethylene terephthalate has a heat contraction ratio (150° C., two hours) of about 8.3% in a first or longitudinal direction and about 8.6% in a second or width direction. The thin magnetic metallic film layer 36 is a thin metallic film, about 9.3 $\mu$m thick, made of Co-Ni alloy. The magnetic tape 38 thus fabricated is warped making the side of its magnetic layer concave because of internal stress left in the thin magnetic metallic film layer 36.

Cracks are made in the thin magnetic metallic film layer 36 according to a second step so as to eliminate the warp from the magnetic tape 38. The magnetic tape 38 is wound around the feeding roller 12, passed between idler and heating rollers 18 and 14, then between heating and idler rollers 14 and 19, and finally wound around the winding roller 16, as shown in FIGS. 1 and 2. The magnetic tape 38 is passed in this case around the heating roller 14 with its base film 34 (see FIG. 3) in contact with the outer circumferential surface of the heating roller 14. Angles at which the magnetic tape 38 is passed around the heating roller 14 can be adjusted by moving idler rollers 18 and 19 along guide slits 32, respectively. The heating roller 14 is heated to about 125°±2° C. by means of the heater housed therein and the base film 34 is heated by this heating roller 14.

The winding roller 16 is rotated in a clockwise direction by means of the motor 22, causing the magnetic tape 38 to run in its longitudinal direction. When the magnetic tape 38 is running, the rotating rate of feeding roller 12 is controlled by the control means 28 to exert a tension to the magnetic tape 38 in its longitudinal direction. This tension acting on the magnetic tape 38 is set larger than the heat contraction ratio of the base film 34 in its longitudinal direction. The running speed of magnetic tape 38 is set about 6 m/min while the tension acting on the magnetic tape 38 about 2.5 kg/mm$^2$ in this case.

By heating the magnetic tape 38 with tension on it in its longitudinal direction, the base film 34 is heat-contract only in its width direction but not in its longitudinal direction. When the base film 34 is allowed to heat-contract only in its width direction, cracks are caused in the thin magnetic metallic film layer 36, extending substantially parallel to the longitudinal direction of the thin magnetic metallic film layer 36. Cracks thus made in the magnetic layer 36 enable the warp of magnetic tape 38 to be eliminated and flexibility to be given to the magnetic tape 38. The magnetic tape 38 provided with cracks in the magnetic layer 36 thereof is wound up around the winding roller 16 and the process of manufacturing the magnetic tape is thus finished.

The size and number of cracks formed on the thin magnetic metallic film layer 36 can be varied by adjusting the temperature of heating roller 14, the running speed of magnetic tape 38 and the winding angles of tape 38 around the heating roller 14.

The relation between the heat contraction ratio of base film and the occurrence of cracks was studied varying heat contraction ratios of base film both in its longitudinal and width directions and it has been found that cracks are caused in the case of only those base films which have a heat contraction ratio larger than 4% in their direction of width. Experimental results are shown in the following Table.

TABLE

| | Base film (polyethylene terephthalate) | | |
|---|---|---|---|
| Thickness | Heat contraction ratio in longitudinal direction | Heat contraction ratio in width direction | Crack occurrence |
| 6.0 μm | 6.0% | 5.3% | Present |
| 5.5 μm | 5.5% | 3.0% | No |
| 6.2 μm | 8.3% | 8.6% | Present |
| 5.8 μm | 5.7% | 3.0% | No |

As described above, cracks extending nearly parallel to the longitudinal direction of thin magnetic metallic film layer 36 are made in the thin magnetic metallic film layer 36 by heating the base film 34 while exerting tension on the magnetic tape 38 in its longitudinal direction. Therefore, the method according to the present invention can be easily embodied not using in special mechanical units such as concave and convex rollers but common mechanical units such as cylindrical rollers. The method cheaply produces a magnetic tape with excellent running capacity and with cracks on its magnetic layer.

Although the method of fabricating a magnetic tape comprising a thin magnetic metallic film layer of Co-Ni alloy and a base film of polyethylene terephthalate has been described above as an embodiment of present invention, the present invention can be applied to other magnetic recording media of thin metallic film type such as a magnetic tape or sheet comprising a thin magnetic metallic film layer of Co-P alloy and a base film of polyester, for example. It is necessary, however, that the heat contraction ratio of base film is larger than 4% in the second or width direction. The tension exerting on the magnetic recording medium is not limited to the value mentioned in the above described embodiment, but may be of such value that can prevent the base film from being heat-contracted in its longitudinal direction. The heating meand for heating the heating roller is not limited to the heater but may be a heating liquid, for example. The manner of forming the magnetic layer in the first step is not limited to vacuum evaporation but may be sputtering.

What is claimed is:

1. A method of manufacturing a magnetic recording medium of thin metallic film type comprising:
   a first step of forming a thin magnetic metallic film layer on a base film which heat-contracts both in a first direction and in a second direction perpendicular to the first direction; and
   a second step of heating the base film, while preventing the base film from heat-contracting in the first direction and thus heat-contracting the base film in the second direction, thereby making cracks in the thin magnetic metallic film layer which extend substantially parallel to the first direction of the base film.

2. A method according to claim 1, wherein said second step includes a process of exerting tension larger than the heat contraction ratio of the base film in the first direction, on the base film in the first direction to prevent the base film from heat-contracting in the first direction.

3. A method according to claim 1, wherein said second step includes a process of heating the base film while running it at a predetermined speed in its first direction.

4. A method according to claim 1, wherein said base film is heated in contact with the outer circumferential surface of a cylindrical roller heated by a heating means during the second step.

* * * * *